(12) United States Patent
Ataya

(10) Patent No.: US 12,229,227 B2
(45) Date of Patent: Feb. 18, 2025

(54) METHOD FOR PROCESSING DATA

(71) Applicant: TDK CORPORATION, Tokyo (JP)

(72) Inventor: Abbas Ataya, Menlo Park, CA (US)

(73) Assignee: TDK CORPORATION, Tokyo (JP)

(*) Notice: Subject to any disclaimer, the term of this patent is extended or adjusted under 35 U.S.C. 154(b) by 66 days.

(21) Appl. No.: 17/822,692

(22) Filed: Aug. 26, 2022

(65) Prior Publication Data
US 2023/0068190 A1 Mar. 2, 2023

Related U.S. Application Data

(60) Provisional application No. 63/260,660, filed on Aug. 27, 2021.

(51) Int. Cl.
| | |
|---|---|
| *G06F 18/243* | (2023.01) |
| *G06F 9/50* | (2006.01) |
| *G06F 18/21* | (2023.01) |
| *G06F 18/211* | (2023.01) |
| *G06F 18/214* | (2023.01) |
| *G06N 5/01* | (2023.01) |
| *G08C 17/02* | (2006.01) |
| *H04N 19/149* | (2014.01) |

(52) U.S. Cl.
CPC ...... *G06F 18/24323* (2023.01); *G06F 9/5005* (2013.01); *G06F 18/211* (2023.01); *G06F 18/2148* (2023.01); *G06F 18/2163* (2023.01); *G06N 5/01* (2023.01); *G08C 17/02* (2013.01); *H04N 19/149* (2014.11); *G06F 2209/5019* (2013.01); *G08C 2201/62* (2013.01)

(58) Field of Classification Search
CPC ............ G06F 18/24323; G06F 9/5005; G06F 18/211; G06F 18/2148; G06F 18/2163; G06F 2209/5019; G06F 18/2413; G06N 5/01; G06N 20/00; G08C 17/02; G08C 2201/62; H04N 19/149
See application file for complete search history.

(56) References Cited

U.S. PATENT DOCUMENTS

| | | | |
|---|---|---|---|
| 2016/0120479 A1* | 5/2016 | Hallberg | A61B 5/0816 600/529 |
| 2016/0284349 A1* | 9/2016 | Ravindran | G10L 15/285 |
| 2017/0352240 A1* | 12/2017 | Carlton-Foss | A61B 5/1116 |
| 2019/0209022 A1* | 7/2019 | Sobol | A61B 5/02055 |

\* cited by examiner

*Primary Examiner* — Sung S Ahn

(57) ABSTRACT

Described herein is a non-transitory computer readable storage medium having computer-readable program code stored thereon for causing a computer system to perform a method for processing data, the method comprising: receiving data, processing the data at a fixed code processing engine, wherein operation of the fixed code processing engine is controlled according to stored parameters, and classifying processed data at a fixed code classification engine, wherein operation of the fixed code classification engine is controlled according to the stored parameters.

20 Claims, 3 Drawing Sheets

METHOD FOR PROCESSING DATA

RELATED APPLICATION

This application claims priority to and the benefit of U.S. Provisional Patent Application 63/260,660, filed on Aug. 27, 2021, entitled "AI FRAMEWORK FOR SENSOR SYSTEMS," by Abbas Ataya, and assigned to the assignee of the present application, which is incorporated herein by reference in its entirety

BACKGROUND

Mobile electronic devices often have limited resources for computing ability, so it is beneficial to design systems within the mobile device to be efficient. Processors with compilers tend to require more recourses than processors without compilers, such as battery life, memory, performance, etc. When using compilers, libraries for the compiler are required, and can result in slower computation speeds.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
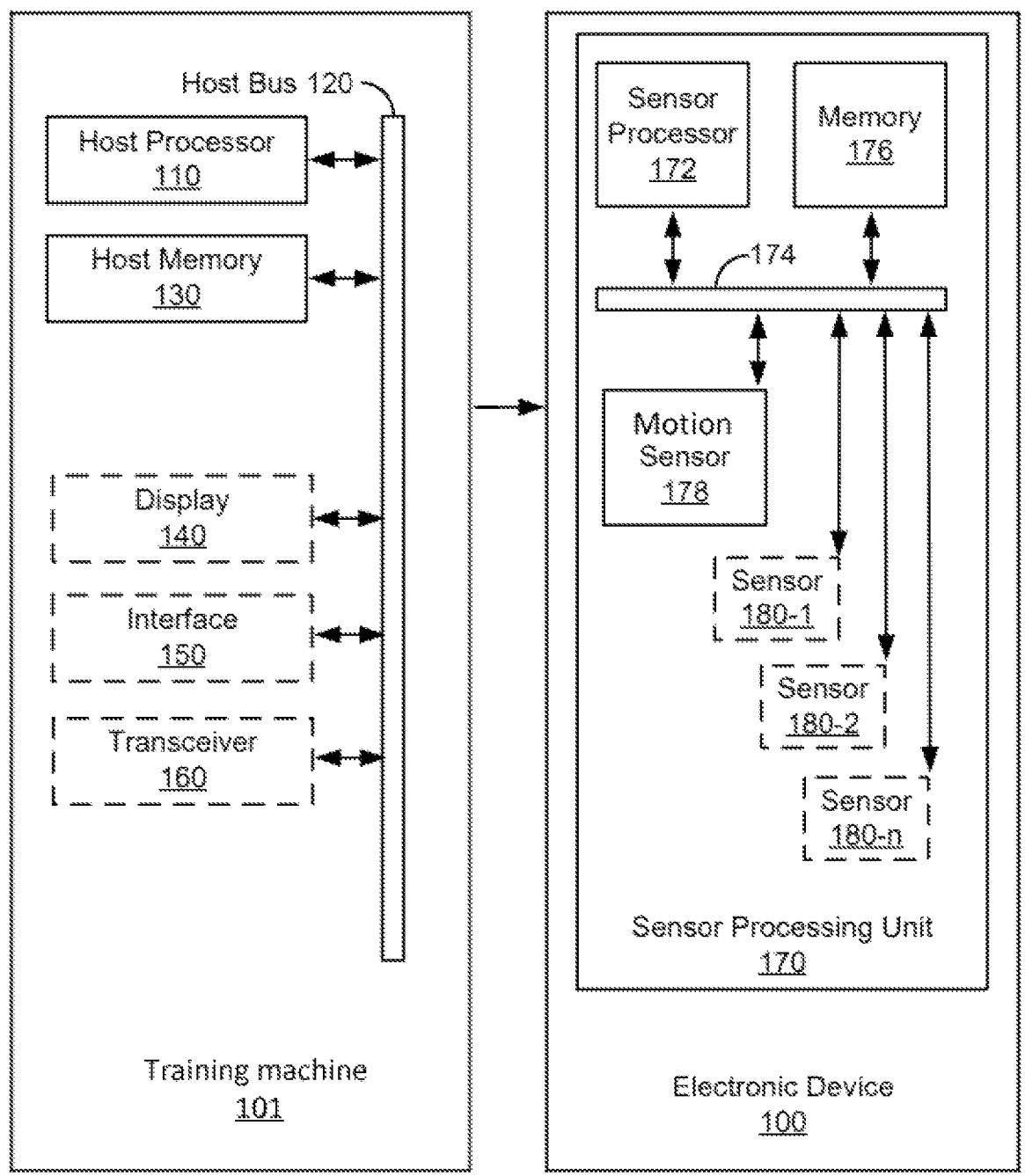
FIG. 1 illustrates a block diagram of an example electronic device and training machine.

The following Description of Embodiments is merely provided by way of example and not of limitation. Furthermore, there is no intention to be bound by any expressed or implied theory presented in the preceding background or brief summary, or in the following detailed description.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "performing," "generating," "selecting," "adjusting," "comparing," "prioritizing," "modifying," "adding," "associating," "filtering," "updating," "forwarding," "labeling," or the like, refer to the actions and processes of an electronic device such as an electrical circuit.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "training processor," as used herein may refer to any of the foregoing structures or any other structure suitable for implementation of the techniques described herein. As it employed in the subject specification, the term "training processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units. Any code trained on the "training processor" may then be deployed on a reduced instruction set computer, or an "reduced instruction set computer (RISC) processor."

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example electronic device with which or upon which various embodiments described herein may be implemented. Examples of an electronic device and training machine are then described. Examples of the training phase and the deployment phase are then described.

Electronic mobile devices, in accordance with the described embodiments, may be used for a variety of purposes. In some cases, there are needs for the electronic mobile device to monitor a user and their activities (e.g., walking, running, sleeping, etc.). In such cases, it is useful for the electronic mobile device to have an efficient system that may adapt to each user.

Embodiments described herein receive data, process the data at a fixed code processing engine, wherein operation of the fixed code processing engine is controlled according to stored parameters, then classify the processed data at a fixed code classification engine, wherein operation of the fixed code classification engine is controlled according to the stored parameters.

Embodiments described herein provide an electronic device including at least one sensor device, a processor, and a memory device having processor-executable code stored thereon for execution by the processor. The code includes a fixed code processing engine for processing sensor data received from the at least one sensor device, a fixed code classification engine for classifying processed sensor data, where the fixed code processing engine and the fixed code classification engine are configurable according to a plurality of parameters that define operation of the fixed code processing engine and the fixed code classification engine.

Example Electronic Device and Training Machine

Turning now to the figures, FIG. 1 illustrates a block diagram of an example electronic device 100 and training machine 101, according to some embodiments. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. Training machine 101 may be implemented as a device or apparatus, for example a computer, such as a desktop computer, server rack, virtual machine, laptop, etc.

As depicted in FIG. 1, training machine 101 may include a host processor 110, a host bus 120, a host memory 130, and a sensor processing unit 170. Some embodiments of training machine 101 may further include one or more of a display device 140, an interface 150, a transceiver 160 (all depicted in dashed lines) and/or other components. In various embodiments, electrical power for training machine 101 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of training machine 101.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of training machine 101 may be coupled communicatively through host bus 120 in order to exchange commands and data. Depending on the architecture, different bus configurations may be employed as desired. For example, additional buses may be used to couple the various components of training machine 101, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for training machine 101 to control and manage system resources in real time, enable functions of application software and other layers, and interface application programs with other software and functions of training machine 101. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single training machine 101, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at training machine 101 from an external transmission source and transmission of data from training machine 101 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

In some embodiments, electronic device 100 includes a display (not shown) similar to display 140. In some embodiments, electronic device 100 includes an interface (not shown) similar to interface 150. In some embodiments, electronic device 100 includes a transceiver (not shown) similar to transceiver 160.

As depicted in FIG. 1, electronic device 100 may include a general purpose sensor assembly in the form of integrated Sensor Processing Unit (SPU) 170 which includes sensor processor 172, memory 176, a motion sensor 178, and a bus 174 for facilitating communication between these and other components of SPU 170. In some embodiments, SPU 170 may include at least one additional sensor 180 (shown as sensor 180-1, 180-2, . . . 180-$n$) communicatively coupled to bus 174. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to a host bus through an interface (not shown).

Some embodiments of electronic device 100 may further include one or more of a display device, an interface, a transceiver (all not shown) and/or other components. In various embodiments, electrical power for electronic device 100 is provided by a mobile power source such as a battery (not shown), when not being actively charged.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that motion sensor 178 and additional sensor 180, when included, may also utilize processing and memory provided by other components of electronic device 100.

In some embodiments, sensor processor 172 is a reduced instruction set computer (RISC). In this embodiment, there is an internal measurement unit which is run on the sensor processor 172.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, motion sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from motion sensor 178 and/or one or more sensor 180, as well as the received data either in its raw form or after some processing. Such algorithms and routines may be implemented by sensor processor 172 and/or by logic or processing capabilities included in motion sensor 178 and/or sensor 180.

Motion sensor 178 is a sensor capable of sensing a form or type of motion, including without limitation a gyroscope or an accelerometer. A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), another inertial or motion sensor (e.g., a gyroscope, accelerometer, or magnetometer) for measuring the orientation or motion of the sensor in space, or other type of sensor for measuring other physical or environmental conditions. In one example, sensor 180-1 may comprise an acoustic sensor, sensor 180-2 may comprise a temperature sensor, and sensor 180-*n* may comprise a motion sensor.

In some embodiments, motion sensor 178 and/or one or more sensors 180 may be implemented using a microelectromechanical system (MEMS) that is integrated with sensor processor 172 and one or more other components of SPU 170 in a single chip or package. Although depicted as being included within SPU 170, one, some, or all of motion sensor 178 and/or one or more sensors 180 may be disposed externally to SPU 170 in various embodiments.

Examples of Training Phase and Deployment Phase

Figure 2:
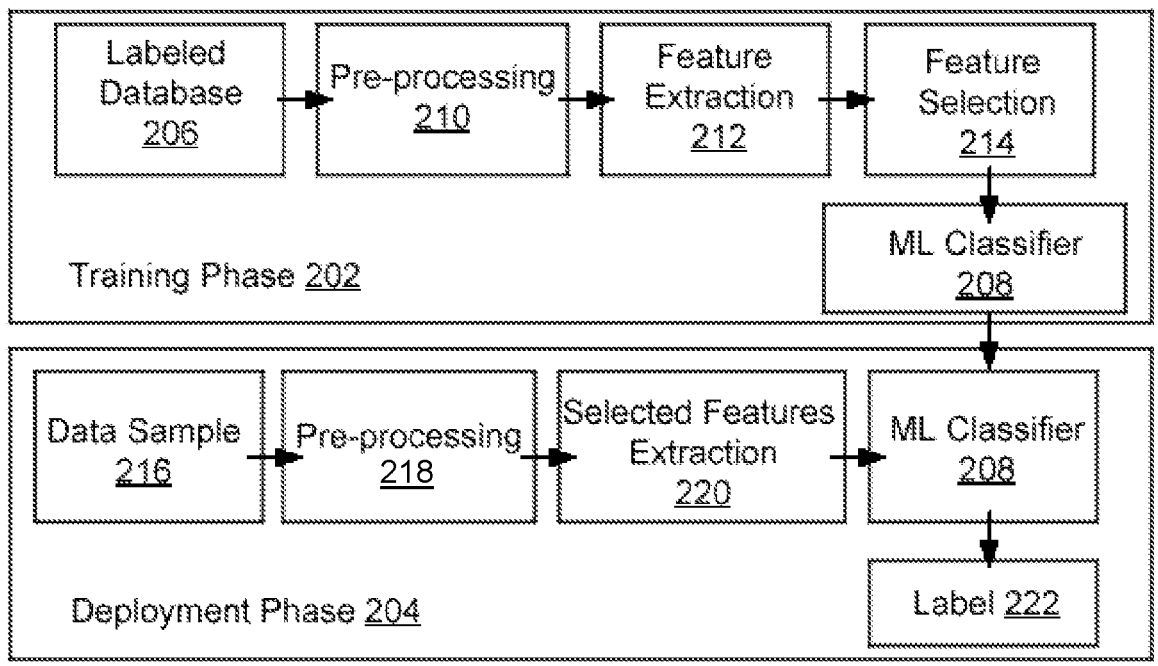
FIG. 2 illustrates a block diagram of the machine learning engine flow, according to some embodiments.

FIG. 2 illustrates a block diagram of the machine learning engine flow 200, according to some embodiments. Training phase 202 takes place on training machine 101. Once the training phase 202 is complete, the trained machine learning (ML) classifier 208 is deployed on electronic device 100 in the deployment phase 204.

The training phase 202 revolves around training a ML classifier 208 to correctly identify patterns, and to make decisions from previous data. For example, if there is a large amount of data on a walking motion and a running motion, then after training the ML classifier 208 can receive a new set of data and correctly classify the new data as either walking or running. The data used for training may vary in the features included such that different models may be trained and deployed for different use cases.

In some embodiments, the training phase 202 is done offline. In some embodiments, the training phase 202 is not restricted in memory, speed, cost, etc., as the deployment phase 204 might be.

In the training phase 202, a labeled database 206 is used to train the ML classifier 208. The data within the labeled database 206 contains data that will undergo preprocessing to extract features, the extracted features then being input into the ML classifier which should be able to accurately classify and label the features. Features may include mean, variance, energy, number of peaks, peak distance, mean cross rate, dominant frequencies, spectral power, etc. The data within the labeled database 206 contains corresponding labels to what activity the data describes. For example, if the data is a set of motion data from a person running, then the data will be labeled as running. Other activities may include walking, sleeping, sitting, driving, exercising, etc.

First, the data will go through pre-processing 210. This stage may include eliminating noise in the data and putting the data in a more appropriate format for the following steps. Next, the data will go through the feature extraction 212 stage. Here, the data is analyzed (without the labels) for what activity the data might portray. Next, in the feature selection 214 stage, the less important features are filtered out, and the more important features are retained. The feature selection 214 may be done through a numerical threshold, human input, redundancy, or similar filtering methods.

Finally, the selected features are put into the ML classifier 208, which will take the features and label them. The ML classifier 208 labels may then be compared against the labels from the labeled database 206 for accuracy.

The training phase 202 is repeated until the ML classifier 208 is able to accurately label the features to a satisfactory degree. During these repetitions, ML classifier 208 is adjusted with the goal of being able to accurately label features. Once the ML classifier is judged to be ready, the deployment phase 204 is started.

Deployment phase 204 has the ML classifier 208 deployed on an electronic device (e.g., electronic device 100). In some embodiments, ML classifier 208 is deployed as a fixed code classification engine stored on memory 176 for execution by sensor processor 172. Once deployed, data sample 216 becomes the new input. In some embodiments, data sample 216 is received from at least motion sensor 178 or sensor 180. In some embodiments, data sample is a mix of preprocessed data and real time data.

After being received, data sample 216 will go through preprocessing 218 where noise is removed, and the data is formatted. Next, based on the feature extraction 212 and feature selection 214 stages of training phase 202, the data will go through the selected features extraction 220 phase. Here, the features that were determined to be important during the training phase 202 are extracted from the data. The extracted features will then go through ML classifier 208, where they receive a label 222 according to the activity performed in the feature (e.g., walking, running, sleeping, etc.).

In some embodiments, the described embodiments are run on a processor without a compiler during the deployment phase 204. Traditional systems with compilers require hard coded libraries for the processes and translation to machine language, which can slow down whatever process is being run. By using a processor without a compiler, such as a RISC processor, aspects such as performance, battery life, and cost are improved over general purpose processors.

Figure 3:
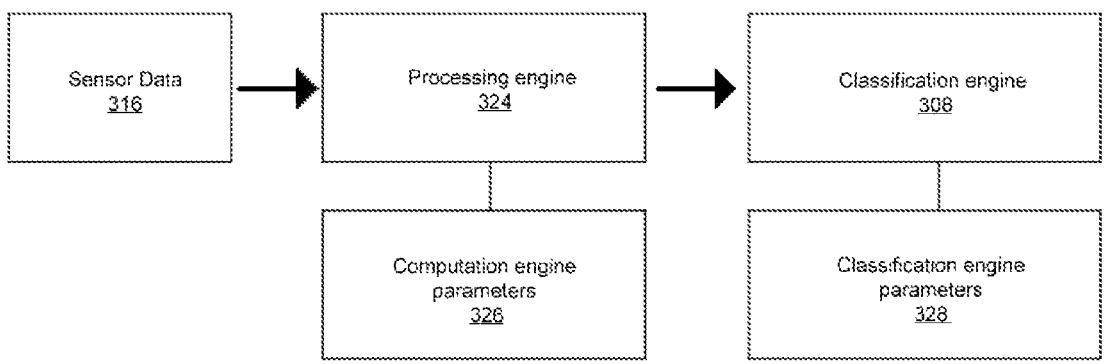
FIG. 3 illustrates a block diagram of the deployed model according to some embodiments.

FIG. 3 illustrates a block diagram of the deployed model 300. The deployed model has an input of data 316. Data 316 is run through processing engine 324, before being run though ML classifier 308.

In some embodiments, the deployed model 300 is deployed on a processor that does not have a compiler. The benefits of running on a processor with no compiler include being cost efficient, power efficient, and high performance. As the fixed code processing engine and the fixed code classification engine are fixed in the memory for execution by a processor without a compiler, the described embodiments are ideal for such a system due to its ability to edit the function with parameters.

Data 316 may also be referred to as input data, sensor data, or gathered data. In some embodiments, data 316 is collected from motion sensor 178. In some embodiments, data 316 is collected from sensors 180. In some embodiments, processing engine 324 is a fixed code processing engine 324. In some embodiments, ML classifier 308 is a fixed code classification engine 308.

In the processing engine 324 data 316 is filtered and features are extracted. The filtering of the sensor data and extraction of the features are controlled by computation engine parameters 326. Computation engine parameters 326 are updatable. In some embodiments, the computation engine also segments the data 316 into windows of a number of samples.

After passing through the processing engine 324, the processed sensor data is passed to the classification engine 308 where the data is classified. In some embodiments, the classification engine 308 determines and labels the processed sensor data.

In some embodiments, classification engine parameters 328 control the operation of classification engine 308. The parameters can affect the classification and labeling of the processed sensor data. Classification engine parameters 328 are updatable.

Classification engine parameters 328 and computation engine parameters 326 may collectively be referred to as the stored parameters. In some embodiments, an updated set of parameters is received, and the stored parameters are updated according to the updated parameters. In some embodiments, the stored parameters can automatically update based on the processed sensor data.

In some embodiments, the stored parameters can enable or disable a function of the processing engine 324. In some embodiments, the stored parameters can enable or disable a function of the classification engine 308. In some embodiments, the stored parameters are stored in the RAM. In some embodiments, the stored parameters can be manually updated. The stored parameters may also be referred to as a plurality of parameters.

Figure 4:
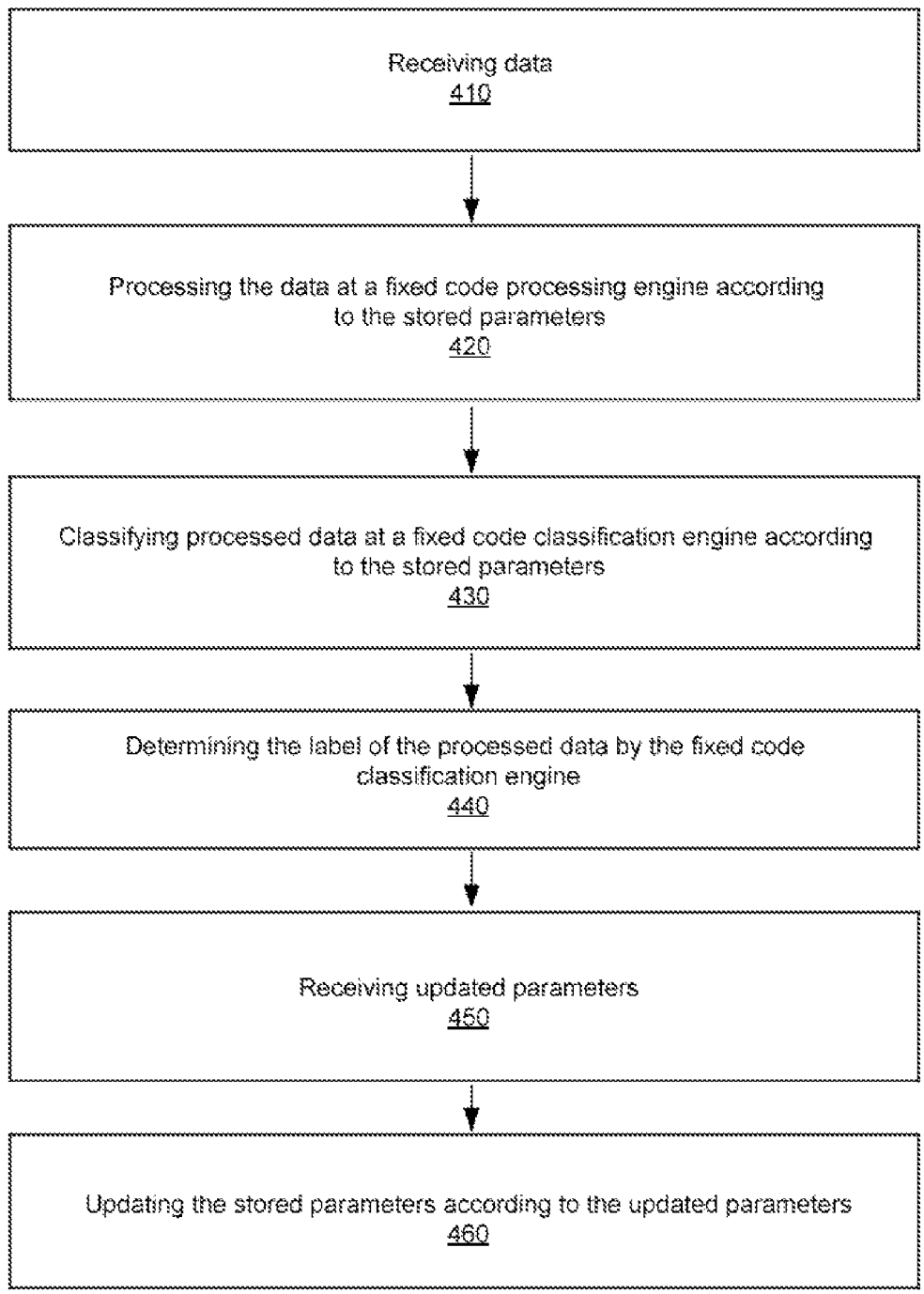
FIG. 4 illustrates a flow diagram of an example process for a data processing method, according to some embodiments.

FIG. 4 illustrates a flow diagram 400 of an example process for a data processing, according to some embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

At procedure 410 of flow diagram 400, data is received by the system. In some embodiments, the data is received from a sensor that collected the data.

At procedure 420, the data is processed at the fixed code processing engine, according to the stored parameters. Here, the data is filtered (e.g., for noise), and the features are extracted. The extracted features are determined based on the stored parameters. In one embodiment, the processing engine utilizes the computation engine parameters to control the operation of the processing engine. In one embodiment, the computation engine parameters control the filtering of data and extracting the features from the data. After this step, the data is referred to as processed data.

At procedure 430, the processed data is classified in the fixed code classification engine, according to the stored parameters. In one embodiment, the classification engine utilizes the classification engine parameters to control the operation of the classification engine. In one embodiment, the classification engine parameters control the classification and labeling of the processed data for a plurality of applications.

At procedure 440, after the processed data is classified, the classification engine determines and assigns a label to the data.

In some embodiments, at procedure 450, an updated set of parameters is received. In some embodiments this updated set of parameters is manually updated. In some embodiments the updated set of parameters are automatically generated.

In some embodiments, at procedure 460, the stored parameters are updated according to the updated set of parameters.

In some embodiments, the stored parameters comprise the computation engine parameters and the classification engine parameters. In some embodiments, the stored parameters can enable and disable a function of the fixed code processing engine. In some embodiments, the stored parameters can enable and disable a function of the fixed code classification engine.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A non-transitory computer readable storage medium having computer-readable program code stored thereon for causing a computer system to perform a method for processing data, the method comprising:
receiving data;
processing the data at a fixed code processing engine, wherein operation of the fixed code processing engine is controlled according to stored parameters, wherein the stored parameters control filtering of the data and extracting features from the data; and
classifying processed data at a fixed code classification engine, wherein operation of the fixed code classification engine is controlled according to the stored parameters, wherein the stored parameters control classification of processed data for a plurality of applications;

wherein the fixed code processing engine and the fixed code classification engine are fixed in memory for execution by a processor without a compiler such that the fixed code processing engine and the fixed code classification engine are configurable according to the stored parameters that define operation of the fixed code processing engine and the fixed code classification engine.

2. The non-transitory computer readable storage medium of claim 1, the method further comprising:
determining the label of the processed data by the fixed code classification engine.

3. The non-transitory computer readable storage medium of claim 1, the method further comprising:
receiving updated parameters; and
updating the stored parameters according to the updated parameters.

4. The non-transitory computer readable storage medium of claim 1, wherein the stored parameters comprise computation engine parameters for controlling operation of the fixed code processing engine and classification engine parameters for controlling operation of the fixed code classification engine.

5. The non-transitory computer readable storage medium of claim 4, wherein the computation engine parameters control the filtering of the data and the extracting the features from feature extraction of the data.

6. The non-transitory computer readable storage medium of claim 4, wherein the classification engine parameters control classification of the processed data for a plurality of applications.

7. The non-transitory computer readable storage medium of claim 1, wherein the stored parameters can enable or disable a function of the fixed code processing engine.

8. The non-transitory computer readable storage medium of claim 1, wherein the stored parameters can enable or disable a function of the fixed code classification engine.

9. The non-transitory computer readable storage medium of claim 1, wherein the stored parameters can automatically update based on the processed data.

10. The non-transitory computer readable storage medium of claim 1, wherein the data is collected through a sensor.

11. A sensor system comprising:
at least one sensor device;
a processor without a compiler;
a memory device having processor-executable code stored thereon for execution by the processor, the code comprising:
a fixed code processing engine for processing sensor data received from the at least one sensor device;
a fixed code classification engine for classifying processed sensor data; and
a plurality of parameters that define operation of the fixed code processing engine and the fixed code classification engine, wherein the plurality of parameters control filtering of the data and extracting features from the data at the fixed code processing engine, wherein the plurality of parameters control classification of processed data for a plurality of applications at the fixed code classification engine, and wherein the fixed code processing engine and the fixed code classification engine are configurable according to the plurality of parameters.

12. The sensor system of claim 11, wherein the plurality of parameters are configurable responsive to receiving updated parameters.

13. The sensor system of claim 11, wherein a parameter of the plurality of parameters can enable or disable a function of the fixed code processing engine.

14. The sensor system of claim 11, wherein a parameter of the plurality of parameters can enable or disable a function of the fixed code classification engine.

15. The sensor system of claim 11, wherein the plurality of parameters can automatically update based on the processed sensor data.

16. The sensor system of claim 11, wherein the fixed code classification engine is configured to label the processed sensor data.

17. The sensor system of claim 11, wherein the plurality of parameters comprise computation engine parameters for controlling operation of the fixed code processing engine and classification engine parameters for controlling operation of the fixed code classification engine.

18. The sensor system of claim 17, wherein the computation engine parameters control filtering of the sensor data and feature extraction of the sensor data.

19. The sensor system of claim 17, wherein the classification engine parameters control classification of the processed sensor data for a plurality of applications.

20. The sensor system of claim 11, wherein the processor is a reduced instruction set computer (RISC) processor.

* * * * *